United States Patent
Braet et al.

(10) Patent No.: US 10,813,289 B2
(45) Date of Patent: Oct. 27, 2020

(54) SINGLE TOP BEAM FOLDING CORN HEAD MAINFRAME

(71) Applicant: Deere & Company, Moline, IL (US)

(72) Inventors: Andrew J. Braet, East Moline, IL (US); Dennis P. Silver, East Moline, IL (US); Nathan E. Krehbiel, East Moline, IL (US); Shantanu Acharya, Pune (IN)

(73) Assignee: DEERE & COMPANY, Moline, IL (US)

( * ) Notice: Subject to any disclaimer, the term of this patent is extended or adjusted under 35 U.S.C. 154(b) by 217 days.

(21) Appl. No.: 16/000,030

(22) Filed: Jun. 5, 2018

(65) Prior Publication Data

US 2019/0364735 A1    Dec. 5, 2019

(51) Int. Cl.
*A01D 41/14* (2006.01)
*A01D 45/02* (2006.01)

(52) U.S. Cl.
CPC ......... *A01D 41/144* (2013.01); *A01D 45/021* (2013.01)

(58) Field of Classification Search
CPC ..... A01B 73/044; A01B 73/06; A01B 63/008; A01B 73/02; A01B 73/065; A01D 41/144;
(Continued)

(56) References Cited

U.S. PATENT DOCUMENTS 3,683,601 A * 8/1972 Van der Lely ......... A01D 34/13
56/6
4,126,189 A * 11/1978 Channel ............... A01B 73/044
172/456
(Continued)

FOREIGN PATENT DOCUMENTS

DE    102013001651 A1 *  7/2014  ........... A01D 41/144
EP    0827684 A2    3/1998
(Continued)

OTHER PUBLICATIONS

Fantini North America The power of innovation, Corn Headers, 2 pages, also available at http://fantini-na.com/wp-content/uploads/2015/09/Fantini_CornHeaders.pdf.
(Continued)

*Primary Examiner* — Arpad Fabian-Kovacs
(74) *Attorney, Agent, or Firm* — Taft Stettinius & Hollister LLP; Stephen F. Rost

(57) ABSTRACT

A header for a harvester includes a hinge assembly, a center portion having a single center top beam that spans laterally relative to a longitudinal centerline of the header, and a wing portion having a single lateral top beam that is arranged forward of and lower than the single center top beam. The wing portion is attached to the center portion by the hinge assembly wherein the wing portion is pivotable between an unfolded position wherein the wing portion extends laterally away from the longitudinal centerline and a folded position wherein the lateral top beam nests forward of and below the center top beam. A cradle member may be attached to the center portion, the cradle portion receives the lateral top beam when the wing portion is in the folded position. The hinge assembly positions the lateral top beam forward of and below the center top beam in folded and unfolded positions.

20 Claims, 6 Drawing Sheets

(58) Field of Classification Search
CPC ...... A01D 45/021; A01D 47/00; A01D 34/04; A01D 41/14
See application file for complete search history.

(56) References Cited

U.S. PATENT DOCUMENTS

| | | | | |
|---|---|---|---|---|
| 4,320,805 | A * | 3/1982 | Winter | A01B 73/044 172/456 |
| 4,409,780 | A * | 10/1983 | Beougher | A01B 73/02 172/456 |
| 5,540,290 | A * | 7/1996 | Peterson | A01B 73/044 172/311 |
| 5,577,563 | A * | 11/1996 | Holen | A01B 73/044 111/57 |
| 5,673,543 | A * | 10/1997 | Richardson | A01D 41/144 56/228 |
| 5,724,798 | A * | 3/1998 | Stefl | A01D 41/144 172/311 |
| 5,845,472 | A * | 12/1998 | Arnold | A01D 41/144 56/94 |
| 5,911,625 | A * | 6/1999 | von Allworden | A01D 41/144 460/119 |
| 6,003,615 | A * | 12/1999 | Moore | A01B 73/044 172/311 |
| 7,360,351 | B2 * | 4/2008 | Rickert | A01D 41/144 56/228 |
| 7,430,846 | B2 * | 10/2008 | Bomleny | A01D 41/141 56/10.2 E |
| 7,614,206 | B2 | 11/2009 | Tippery et al. | |
| 9,072,222 | B2 | 7/2015 | Bomleny et al. | |
| 9,173,345 | B2 * | 11/2015 | Cressoni | A01D 45/021 |
| 9,730,375 | B2 * | 8/2017 | De Coninck | A01B 63/008 |
| 10,433,483 | B2 * | 10/2019 | Cook | A01D 41/141 |
| 10,537,063 | B2 * | 1/2020 | Mossman | A01D 41/144 |
| 2003/0226342 | A1 * | 12/2003 | Boeckmann | A01D 41/144 56/14.7 |
| 2011/0258811 | A1 * | 10/2011 | Borkgren | A01B 73/046 16/319 |
| 2015/0373907 | A1 * | 12/2015 | Schulze Ruckamp | A01D 41/16 56/246 |
| 2016/0262301 | A1 * | 9/2016 | van Vooren | A01B 73/06 |
| 2018/0035598 | A1 * | 2/2018 | Wenger | A01B 73/065 |
| 2018/0139898 | A1 | 5/2018 | Shearer | |
| 2018/0310472 | A1 * | 11/2018 | Vandeven | A01D 41/14 |
| 2019/0045709 | A1 * | 2/2019 | Schroeder | A01D 61/004 |
| 2019/0075707 | A1 * | 3/2019 | Sivinski | A01B 63/10 |
| 2019/0110402 | A1 * | 4/2019 | Vandeven | A01D 41/144 |
| 2019/0335663 | A1 * | 11/2019 | Capello | A01D 45/30 |

FOREIGN PATENT DOCUMENTS

| | | | | |
|---|---|---|---|---|
| EP | 1169906 | A1 * | 1/2002 | ........ A01D 41/144 |
| EP | 1685756 | A1 | 8/2006 | |
| EP | 3278653 | A1 | 2/2018 | |
| WO | 02102138 | A1 | 12/2002 | |

OTHER PUBLICATIONS

European Search Report issued in counterpart European Patent Application No. 19178317.4 dated Feb. 10, 2020 (7 pages).

* cited by examiner

SINGLE TOP BEAM FOLDING CORN HEAD MAINFRAME

FIELD OF THE DISCLOSURE

The present disclosure relates to a header for a harvester, and in particular to a folding corn header mainframe for the harvester.

BACKGROUND OF THE DISCLOSURE

Conventional folding corn head mainframes employ a dual top beam mainframe structure. These dual beams are tied into wing frame hinges using a plate and bushing welded fabrication configuration. The welded fabrication typically includes large weldments with thick plates that produce high heat during the weld process. The high heat can cause warping and distortion which impacts the angle tolerance of the pivot axis. Conventional folding frames require a machining operation after welding in order to hold the tighter tolerance on the hinge axis. The additional machining operation adds significant cost and time to the fabrication process. The hinge weld joints create high stress concentrations in this highly loaded area. Another issue with the dual beams of the mainframe are that they are relatively wide fore and aft and are very heavy. Due to the large width and weight, the dual beams impede visibility to the crop flow into the throat of the header. Moreover, the combination of the dual beams with the plate and bushing weld fabrication collect more crop debris build-up between the dual beams or the welded fabrication which further impedes visibility for the operator for line of sight to the roadway or field.

Thus there is a need for improvement for folding corn header mainframes.

SUMMARY

According to one embodiment of the present disclosure, a header for a harvester, includes a hinge assembly, a center portion having a center top beam that spans laterally relative to a longitudinal centerline of the header, and a wing portion having a lateral top beam, the wing portion attached to the center portion by the hinge assembly such that the wing portion pivots between an unfolded position and a folded position, the wing portion being positioned relative to the center portion such that the lateral top beam is both forward of and lower than the center top beam.

In one example, the unfolded position includes the wing portion extending laterally away from the longitudinal centerline, and the folded position includes the wing portion extending toward the longitudinal centerline.

In a second example, wherein the center portion includes a first end portion, the wing portion includes a first end top portion that defines an opening sized to receive the first end portion; and a pin member configured to attach the first end portion to the first end top portion.

In a third example, the header further comprises a cradle member attached to the center portion, the cradle portion configured to receive the lateral top beam when the wing portion is in the folded position.

In a fourth example, the center top beam is a tube.

In a fifth example, the hinge assembly includes a first arm pivotally connected to the center portion; a second arm pivotally connected to the wing portion; and a pin that connects the first arm and the second arm.

In a sixth example, the first arm is a pair of first arms that are configured to rotate about the center top beam.

In a seventh example, the pair of first arms straddle the center top beam when the wing portion is in the folded position.

In an eighth example, the wing portion is pivotally attached to the center portion.

According to another embodiment of the present disclosure, a header for a harvester includes a hinge assembly, a center portion having a single center top beam that spans laterally relative to a longitudinal centerline of the header, and a wing portion having a lateral top beam, the lateral top beam arranged forward of and lower than the single center top beam, the wing portion attached to the center portion by the hinge assembly wherein the wing portion is pivotable between an unfolded position wherein the wing portion extends laterally away from the longitudinal centerline and a folded position wherein the lateral top beam nests below the center top beam.

In a first example of the other embodiment, wherein the center portion includes a first end portion, the wing portion includes a first end top portion that defines an opening sized to receive the first end portion; and a pin member configured to attach the first end portion to the first end top portion.

A second example of the other embodiment, further includes a cradle member attached to the center portion, the cradle portion configured to receive the lateral top beam when the wing portion is in the folded position.

In a third example of the other embodiment, the center top beam includes a tubular member.

In a fourth example of the other embodiment, the hinge assembly includes a first arm pivotally connected to the center portion, a second arm pivotally connected to the wing portion, and a pin that connects the first arm and the second arm. In a further example, the first arm is a pair of first arms that are configured to rotate about the center top beam. In yet another example, the pair of first arms straddle the center top beam when the wing portion is in the folded position.

In a fifth example of the other embodiment, the wing portion is pivotally attached to the center portion.

According to yet another embodiment of the present disclosure, a hinge assembly for a header, the header having a center portion connected to a wing portion, the center portion having a center top beam that spans laterally relative to a longitudinal centerline of the header; the wing portion having a lateral top beam, the hinge assembly further includes a pin, a first arm pivotally connected to the center top beam, and a second arm pivotally connected to the lateral top beam, the first and the second arm pivotally connected together by the pin, wherein the first arm and the second arm are disposed to position the lateral top beam forward of and below the center top beam in either a folded position or an unfolded position.

In a first example of the yet another embodiment, the first arm is a pair of first arms that are configured to rotate about the center top beam. In a further example, the pair of first arms straddle the center top beam when the wing portion is in the folded position.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Some of the benefits of the present disclosure includes a header for assembly with a harvester wherein the header includes a center portion hingedly attached to a wing or wing portion. The center portion includes a single center top beam. The single center top beam is beneficial since in reducing the fore/aft width of the header or mainframe. The wing or wing portion is arranged forward of and lower than the center top beam relative to the direction of forward travel of the harvester which allows the wing or wing portion to nest at a lower profile when the wings are folded. The combination of the single center top beam and lower profile of the wing portion improves visibility to the road when the harvester is transported. The combination also improves visibility when the wing portion is in an unfolded position. The single center top beam also reduces the potential for crop build-up. In one example of a 12 row folding cornhead having a single center top beam compared to a conventional cornhead having a dual top beam wherein both cornheads are in a folded head configuration, the height of the folded head for the single center top beam cornhead is reduced by approximately 300 mm. Additionally, the single center top beam configuration for the center portion as compared to a dual top beam configuration saves mass, reduces the cost to manufacture, and lowers the center of gravity of the header. The single beam configuration also reduces factory complexity due to the reduced number of individual parts and decreased welding required. The single beam configuration also improves manufacturability due to fewer welded parts and lack of machining after weld. The hinge assembly is also very compact which reduces the fore/aft width of the header or mainframe.

Figure 1:
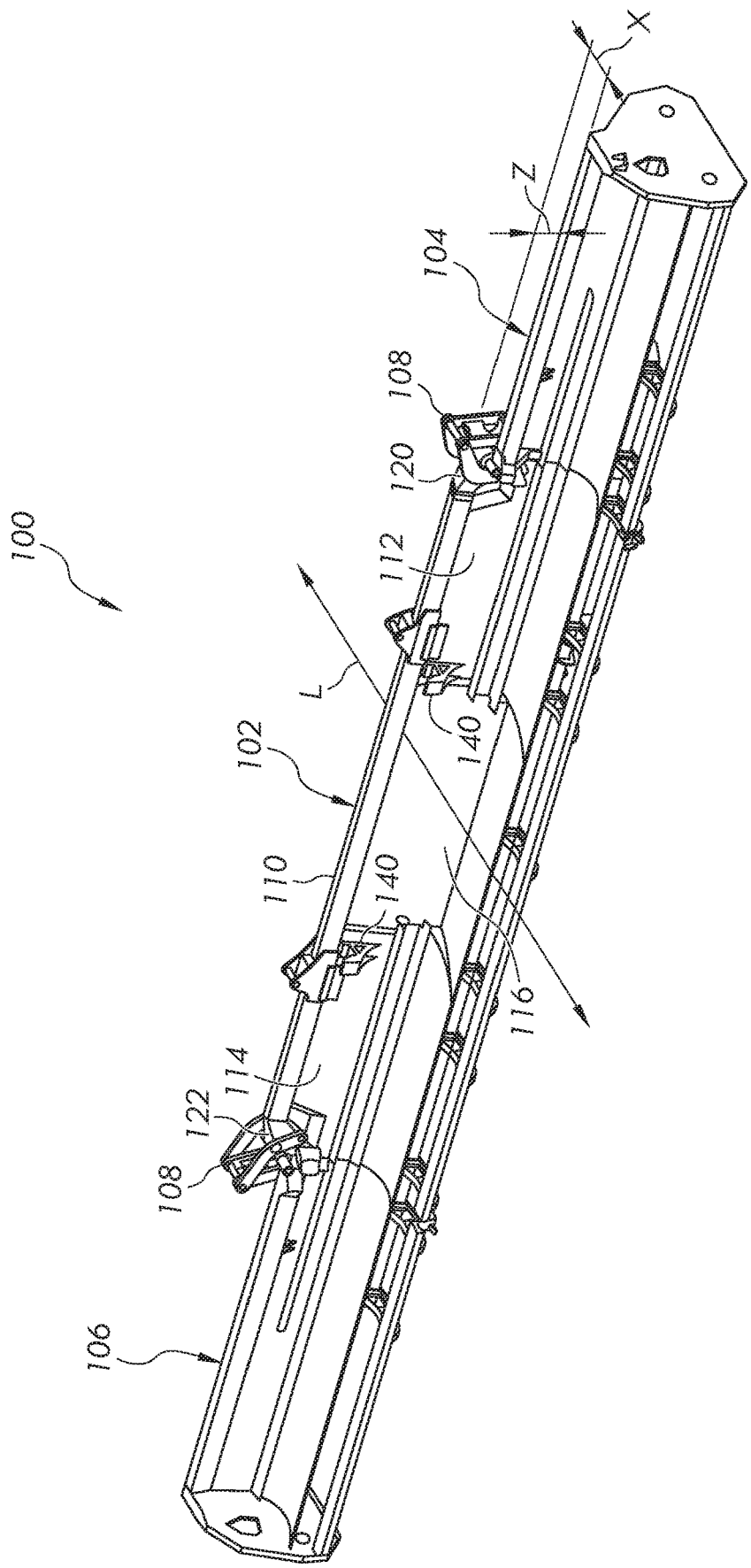
FIG. 1 is a perspective view of a header in an unfolded position.
Figure 6:
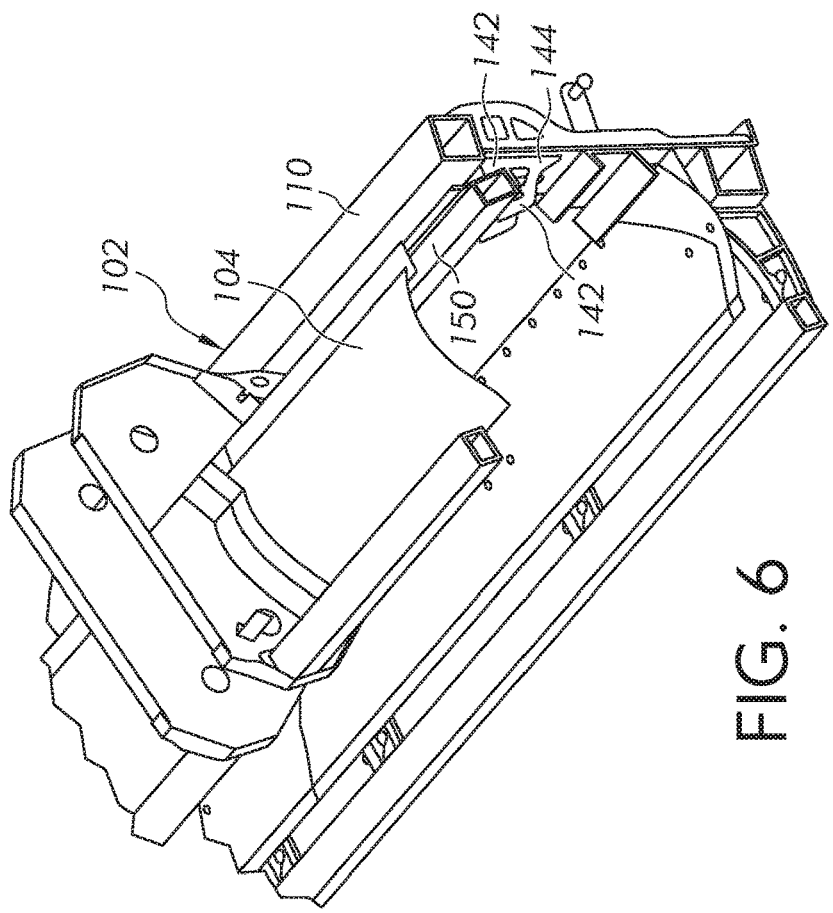
FIG. 6 is a partial front sectional perspective view of the header of FIG. 1 in a folded position.
Figure 7:
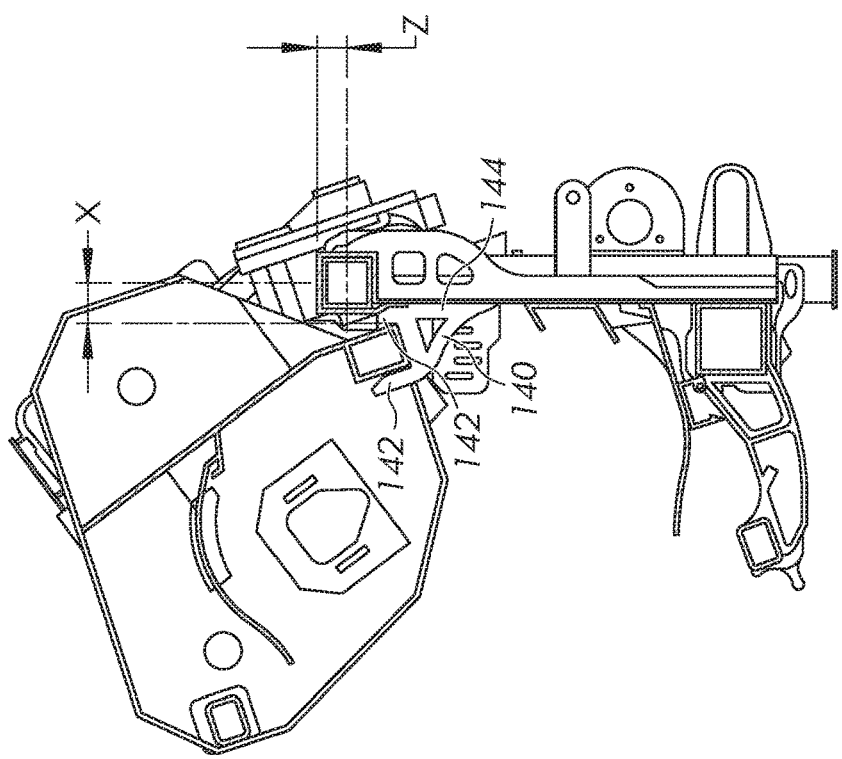
FIG. 7 is a side view of the header of FIG. 6.
Figure 8:
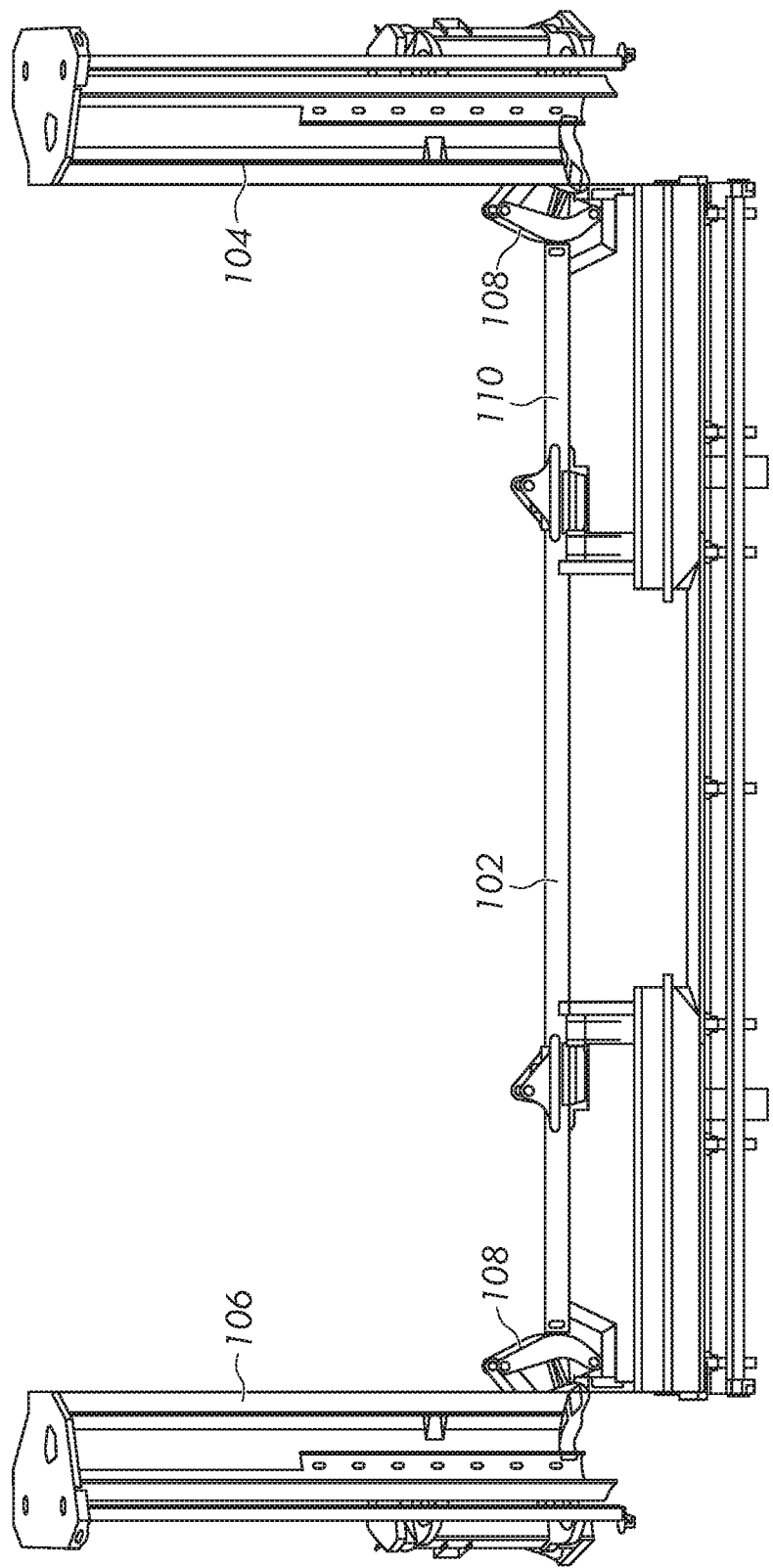
FIG. 8 is a front view of the header of FIG. 1 in a semi-folded position.

Referring now to FIG. 1, a header 100 is illustrated for attachment to a harvester. The header 100 includes a center portion 102, a first wing portion 104, and a second wing portion 106 wherein the first and second wing portions 104 and 106 are each pivotally attached at opposite ends of the center portion 102. The header 100 also includes a pair of hinge assemblies 108 for pivotally attaching the first wing portion 104 and the second wing portion 106 to the center portion 102 as described in more detail below. The first wing portion 104 and the second wing portion 106 pivot about the hinge assemblies 108 from an unfolded position that is illustrated in FIG. 1 to a folded position that is illustrated in FIGS. 6 and 7. In both of the unfolded and folded positions, the first wing portion 104 is positioned relative to the center portion 102 such that a lateral top beam 150 is both forward a distance X and lower a distance Z than a center top beam 110 of the center portion 102. The distance X is measured from a back or rear face of the lateral top beam 150 to the front face of the center top beam 110. The distance Z is measured from the top of the lateral top beam 150 to the top of the center top beam 110. The distances X and Z can vary for the first and second wing portions 104 and 106 being in the unfolded or folded position. The unfolded position includes the first and the second wing portions 104 and 106 extending laterally away from the longitudinal centerline L. The folded position includes the first and the second wing portions 104 and 106 extending toward the longitudinal centerline L. As illustrated in FIG. 8, the first and the second wing portions 104 and 106 pivot about a pivot pin 128 as the hinge assemblies 108 are actuated such that the first and second wing portions 104 and 106 are in a semi-folded position wherein at least a portion of the lateral top beam 150 is above the center top beam 110. As the first and second wing portions 104 and 106 pivot or rotate about the pivot pin 128, the ends of the wing portions 104 and 106 pivot upward with respect to the center portion 102.

Figure 2:
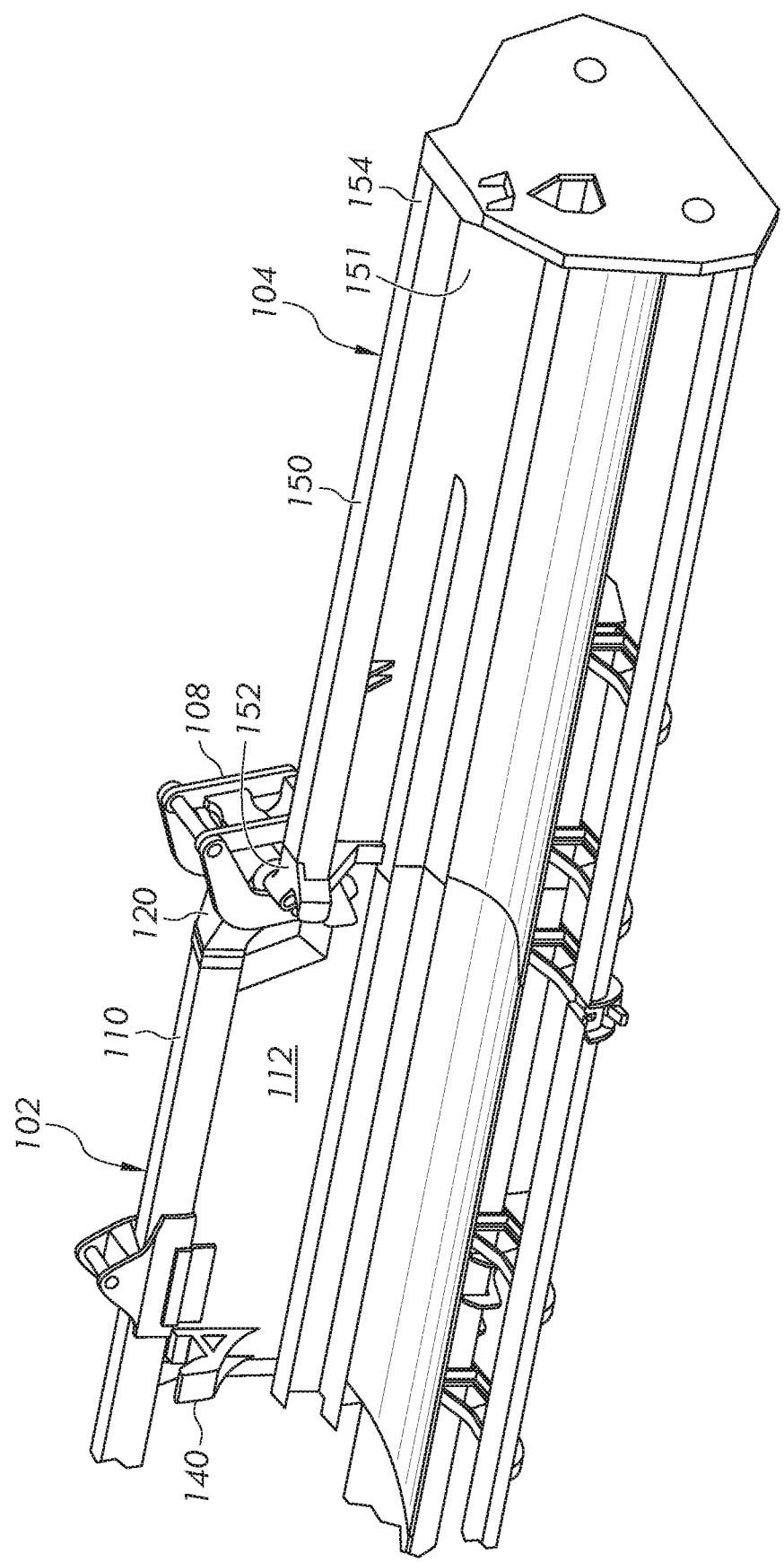
FIG. 2 is a partial perspective view of the header of FIG. 1.
Figure 3:
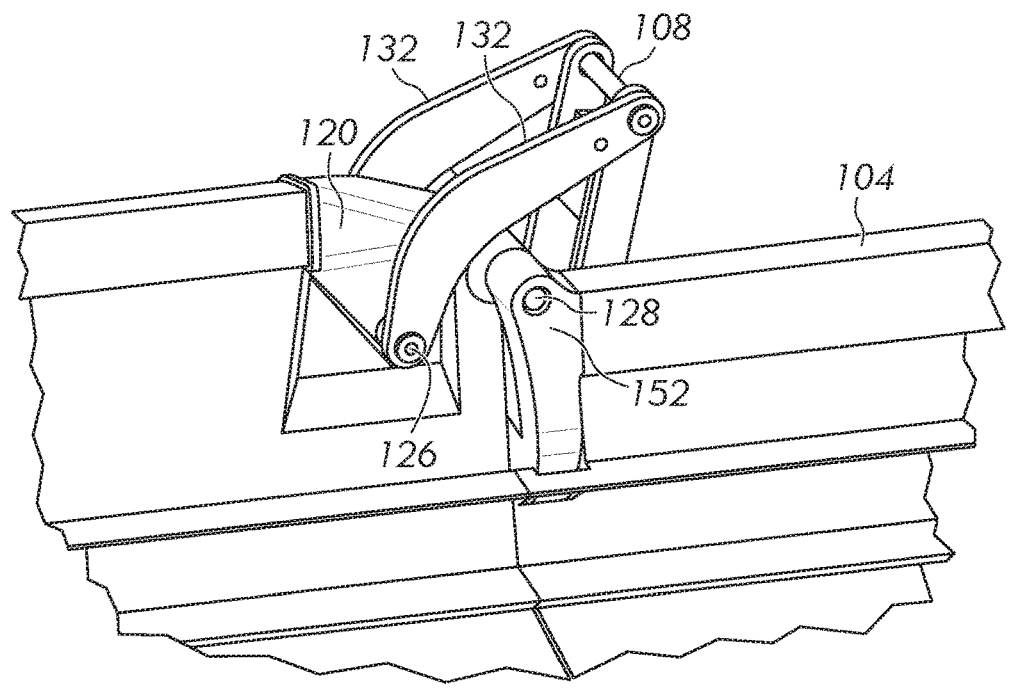
FIG. 3 is a partial front perspective view of the header of FIG. 1.

Referring now to FIGS. 1, 2, and 3, the center portion 102 includes a center top beam 110 that extends laterally relative to a longitudinal centerline L of the header 100. The center portion 102 also includes a first vertical wall 112, a second vertical wall 114, and an aperture 116 that extends between the first vertical wall 112 and the second vertical wall 114. The aperture 116 permits the header 100 to be mounted on a harvester feederhouse.

The center top beam 110 has a length that spans between a first end portion 120 and a second end portion 122. The center top beam 110 is a single beam that can have various cross-sectional shapes such as tubular or solid, cylinder, square, or rectangle to name a few. The center top beam 110 is configured to receive a portion of each of the hinge assemblies 108 as described in more detail below. The first end portion 120 is similar to the second end portion 122 therefore only the first end portion 120 is described.

Figure 4:
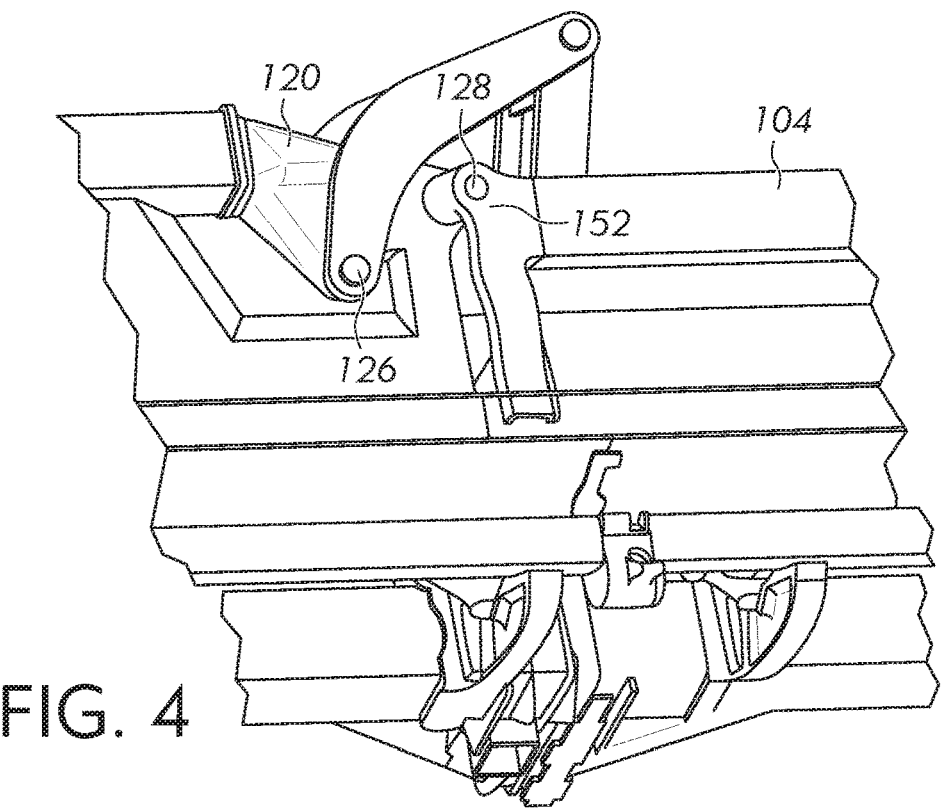
FIG. 4 is a partial front perspective view of the header of FIG. 1.
Figure 5:
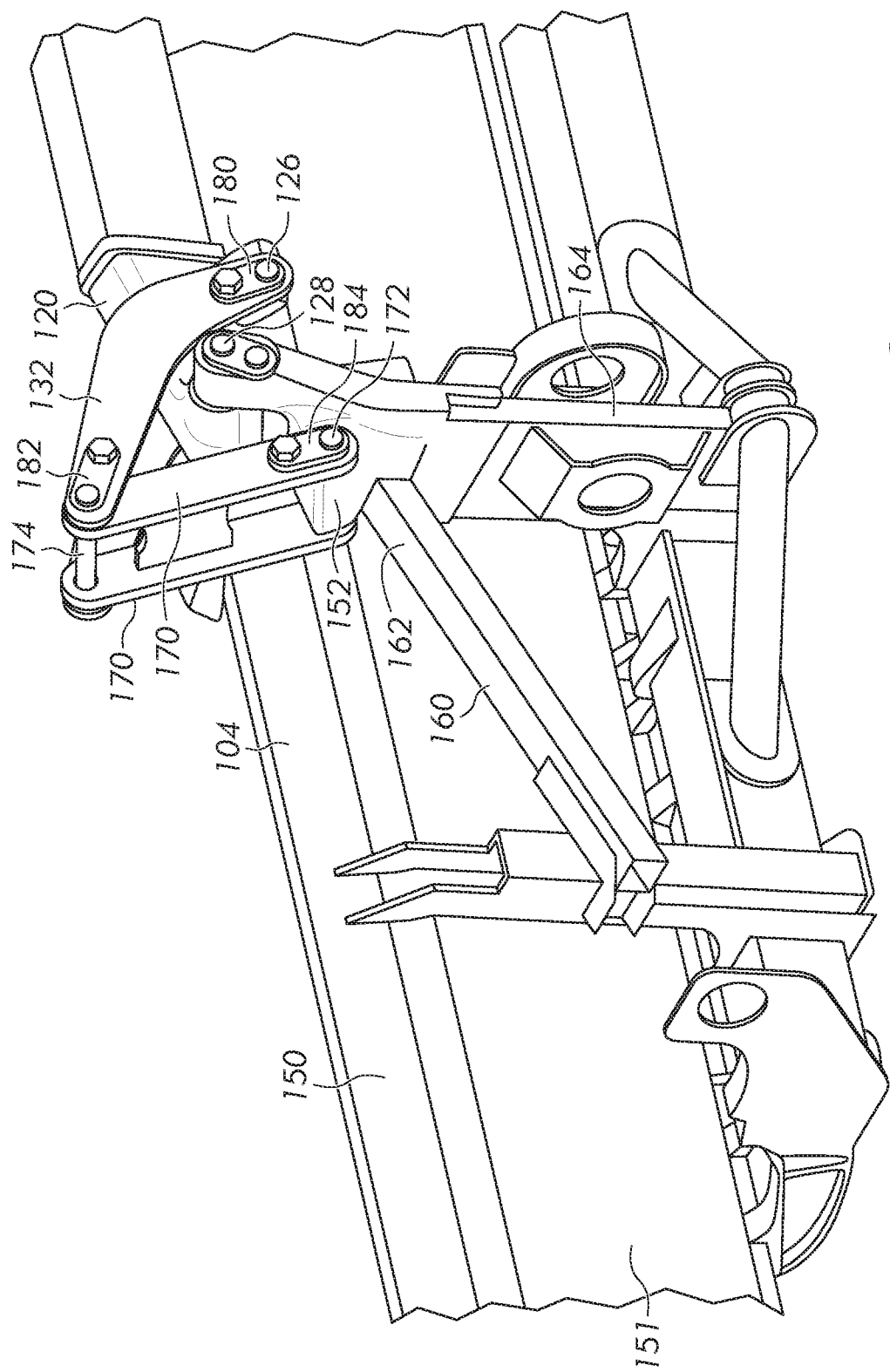
FIG. 5 is a partial rear perspective view of the header of FIG. 1.

Referring now to FIGS. 3, 4, and 5, the first end portion 120 is configured to attach to the first end top portion 152. As illustrated, the first end portion 120 is an elongated member that extends towards the first end top portion 152. The first end portion 120 includes a pivot 126 for connecting the first end portion 120 to the hinge assembly 108. The first end portion 120 includes a pivot pin 128 that connects the first end portion 120 to the first wing portion 104. As the first wing portion 104 rotates about the pivot pin 128, a pair of first arms 132 of the hinge assembly 108 rotates about the center top beam 110 such that the pair of first arms 132 straddle the center top beam 110 when the first wing portion 104 is in the folded position.

The center portion 102 includes a pair of cradle members 140 each configured to receive one of the lateral top beams 150 when the first wing portion 104 and the second wing portion 106 are in the folded position. One of the cradle members 140 is mounted on the first vertical wall 112 and the other of the cradle members 140 is mounted on the second vertical wall 114. In the illustrated embodiment, each of the cradle members 140 includes a pair of arms 142 that are configured to receive a portion of one of the lateral top beams 150 when the first and the second wing portions 104 and 106 are in a folded position. The pair of arms 142 form a U shape but may be configured differently to correspond to the cross-sectional shape of the lateral top beam 150. Each of the cradle members 140 also includes a leg portion 144 that is attached to the first vertical wall 112 or the second vertical wall 114. The leg portion 144 connects with and supports the pair of arms 142. In other forms, the pair of cradle members 140 may be configured differently.

The first wing portion 104 is similar to the second wing portion 106, therefore only first wing portion 104 will be described. The first wing portion 104 includes a lateral top beam 150 that extends laterally relative to the longitudinal centerline L. In both the unfolded and folded positions, the first wing portion 104 is positioned relative to the center portion 102 such that the lateral top beam 150 is both forward a distance X and lower a distance Z than the center top beam 110 of the center portion 102. In the folded position, the lateral top beam 150 nests below the center top beam 110. The first wing portion 104 can also pivot to a semi-folded position such that at least a portion of the lateral top beam 150 is above the center top beam 110 as illustrated in FIG. 8.

The first wing portion 104 is pivotally attached at the pivot pin 128 to the center portion 102. The first wing portion 104 also includes a first vertical wall 151 that substantially aligns with the first vertical wall 112 of the center portion 102 when the first wing portion 104 is in the unfolded position.

The lateral top beam 150 has a length that spans between a first end top portion 152 and a second end top portion 154. The lateral top beam 150 is a single beam that can have various cross-sectional shapes such as tubular or solid, cylinder, square, or rectangle to name a few. In other forms, the lateral top beam 150 can be configured as a dual beam. The first end top portion 152 is configured to receive the first end portion 120 of the center top beam 110. In the illustrated embodiment, the first end top portion 152 includes two arms with an opening between the arms that is sized to receive the first end portion 120 of the center top beam 110. In other embodiments, the first end top portion 152 can be configured differently however in any embodiment the first end top portion 152 is configured to engage and attach to the first end portion 120. The first end top portion 152 is configured to receive the hinge assembly 108, and specifically the pivot pin 128 and the pivot pin 172. The top beam 150 and/or the second end top portion 154 is configured to rest against one of the cradle members 140 when the first wing portion 104 is in the folded position that is illustrated in FIGS. 6 and 7.

The first wing portion 104 includes a structural member 160 that spans along the rear face of the first vertical wall 151. The structural member 160 includes an attachment end portion 162 that spans to the first end top portion 152. In other embodiments, the structural member 160 is not required and may not be mounted on the first wing portion 104. The first wing portion 104 includes a vertical bar member 164 that engages first end top portion 152, but in other embodiments first wing portion 104 may not be included.

The hinge assembly 108 includes a pair of first arms 132 pivotally connected to the center portion 102, a pair of second arms 170 that is pivotally connected at pivot pin 172 to the first wing portion 104, and a pin 174 that connects the pair of first arms 132 to the pair of second arms 170. In other forms, the pair of first arms 132 includes a single first arm and the pair of second arms 170 includes a single second arm. The pair of first arms 132 and the pair of second arms 170 are disposed to position the lateral top beam 150 forward of and below the center top beam 110 in either a folded position or an unfolded position. The first pair of arms 132 are configured to rotate about the pivot pin 128 to straddle the center top beam 110 when the first wing portion 104 is in the folded position. The hinge assembly 108 includes a first retainer 180 for the pivot pin 126, a second retainer 182 for the pivot pin 174, and a third retainer 184 for the pivot pin 172.

The first and second wing portions 104 and 106 can be rotated by a hydraulic cylinder (not illustrated) or other device that retracts to pull the lateral top beam 150 towards the center top beam 110 to rotate the first and second wing portions 104 and 106 to the semi-folded position and the folded position. When the hydraulic cylinder extends it pushes the lateral top beam 150 away from the center top beam 110 to rotate the first and second wing portions 104 and 106 to the unfolded position.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A header of a harvester, comprising:
a hinge assembly;
a center portion having a center top beam that spans laterally relative to a longitudinal centerline of the header; and
a wing portion having a lateral top beam, the wing portion attached to the center portion by the hinge assembly wherein the wing portion is pivotable between an unfolded position and a folded position, the wing portion in the folded position is positioned relative to the center portion such that the lateral top beam is positioned both forward of and lower than the center top beam as measured relative to the longitudinal centerline of the header.

2. The header of claim 1, wherein the unfolded position includes the wing portion extending laterally away from the longitudinal centerline, and the folded position includes the wing portion extending toward the longitudinal centerline.

3. The header of claim 1, further comprising:
wherein the center portion includes a first end portion, the wing portion includes a first end top portion that defines an opening sized to receive the first end portion; and
a pin member that attaches the first end portion to the first end top portion.

4. The header of claim 1, further comprising:
a cradle member attached to the center portion, the cradle portion receives the lateral top beam when the wing portion is in the folded position.

5. The header of claim 1, wherein the center top beam is a tube.

6. The header of claim 1, wherein the hinge assembly includes:
a first arm pivotally connected to the center portion;
a second arm pivotally connected to the wing portion; and
a pin that connects the first arm and the second arm.

7. The header of claim 6, wherein the first arm is a pair of first arms that are rotatable about the center top beam.

8. The header of claim 7, wherein the pair of first arms straddle the center top beam when the wing portion is in the folded position.

9. The header of claim 1, wherein the wing portion is pivotally attached to the center portion.

10. A header of a harvester, comprising:
a hinge assembly;
a center portion having a single center top beam that spans laterally relative to a longitudinal centerline of the header; and
a wing portion having a lateral top beam, the lateral top beam arranged forward of and lower than the single center top beam, the wing portion attached to the center portion by the hinge assembly, the wing portion pivots between an unfolded position that includes the wing portion extended laterally away from the longitudinal centerline and a folded position that includes the lateral top beam nested forward of and below the center top beam to substantially align the lateral top beam with the center top beam.

11. The header of claim 10, wherein the center portion includes a first end portion, the wing portion includes a first end top portion that defines an opening sized to receive the first end portion; and
a pin member that attaches the first end portion to the first end top portion.

12. The header of claim 10, further comprising:
a cradle member attached to the center portion, the cradle portion receives the lateral top beam when the wing portion is in the folded position.

13. The header of claim 10, wherein the center top beam includes a tubular member.

14. The header of claim 10, wherein the hinge assembly includes:
a first arm pivotally connected to the center portion;
a second arm pivotally connected to the wing portion; and
a pin that connects the first arm and the second arm.

15. The header of claim 14, wherein the first arm is a pair of first arms that are configured to rotate about the center top beam.

16. The header of claim 15, wherein the pair of first arms straddle the center top beam when the wing portion is in the folded position.

17. The header of claim 10, wherein the wing portion is pivotally attached to the center portion.

18. A hinge assembly in combination with a header, the header having a center portion connected to a wing portion, the center portion having a center top beam that spans laterally relative to a longitudinal centerline of the header; the wing portion having a lateral top beam, the hinge assembly comprising:
a pin;
a first arm pivotally connected to the center top beam by a first pivot pin, the first arm rotates about the center top beam; and
a second arm pivotally connected to the lateral top beam by a second pivot pin, the second pin rotates about the center top beam, the first and the second arm pivotally connected together by the pin;
wherein the first arm and the second arm are disposed to position the lateral top beam forward of and below the center top beam in either a folded position or an unfolded position.

19. The hinge assembly of claim 18, wherein the first arm is a pair of first arms that rotate about the center top beam.

20. The hinge assembly of claim 19, wherein the pair of first arms straddle the center top beam when the wing portion is in the folded position.

\* \* \* \* \*